United States Patent
Qi et al.

(10) Patent No.: US 10,969,485 B2
(45) Date of Patent: Apr. 6, 2021

(54) SERVO ROTARY SCANNING SYSTEM OF THREE-DIMENSIONAL HOLOGRAPHIC IMAGING

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Xiongwei Huang, Shenzhen (CN); Hanjiang Chen, Shenzhen (CN); Guangsheng Wu, Shenzhen (CN); Shukai Zhao, Shenzhen (CN); Qing Ding, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

(*) Notice: Subject to any disclaimer, the term of this patent is extended or adjusted under 35 U.S.C. 154(b) by 252 days.

(21) Appl. No.: 16/052,650

(22) Filed: Aug. 2, 2018

(65) Prior Publication Data
US 2018/0341015 A1 Nov. 29, 2018

Related U.S. Application Data

(63) Continuation of application No. PCT/CN2016/094865, filed on Aug. 12, 2016.

(30) Foreign Application Priority Data

May 24, 2016 (CN) .......................... 201610349789.0

(51) Int. Cl.
*G01S 13/88* (2006.01)
*G01S 7/03* (2006.01)
(Continued)

(52) U.S. Cl.
CPC .............. *G01S 13/887* (2013.01); *G01S 7/03* (2013.01); *G01S 13/426* (2013.01);
(Continued)

(58) Field of Classification Search
CPC ........ G01S 13/887; G01S 7/03; G01S 13/426; G01S 13/0209; G01S 13/89; G01S 7/02;
(Continued)

(56) References Cited

U.S. PATENT DOCUMENTS 2,001,450 A * 5/1935 Boddie ..................... H04B 3/56
455/402
3,683,392 A * 8/1972 White ....................... H01Q 1/12
343/805
(Continued)

FOREIGN PATENT DOCUMENTS

CN 102419560 A 4/2012
CN 102428361 A 4/2012
(Continued)

OTHER PUBLICATIONS

Machine translation of specification of CN102231548B, Nov. 2, 2011 (Year: 2011).*

(Continued)

*Primary Examiner* — Frank J McGue

(57) ABSTRACT

A servo rotary scanning system of three-dimensional holographic imaging may include a servomotor (20) having a first angle sensor (21), a second angle sensor (30), a control component (40), a servo driver (50) and a rotary frame (10), the servo rotary scanning system of three-dimensional holographic imaging is a full-closed loop servo control system, the second angle sensor (30) detects an actual rotating angle of the rotary frame (10) and feeds back a frame feedback signal to the control component (40), an instruction signal in the control component (40) is compared with the frame
(Continued)

feedback signal to generate a following error, the first angle sensor (21) detects an output rotating angle of the servomotor (20) and feeds back a motor feedback signal to the servo driver (50), and the servo driver (50) controls the servomotor (20) to rotate according to the following error and the motor feedback signal.

18 Claims, 3 Drawing Sheets

(51) Int. Cl.
| | |
|---|---|
| *H01Q 1/00* | (2006.01) |
| *H01Q 3/24* | (2006.01) |
| *G01S 13/42* | (2006.01) |
| *H01Q 3/04* | (2006.01) |
| *G05B 19/414* | (2006.01) |
| *G01S 13/02* | (2006.01) |
| *G01S 13/89* | (2006.01) |

(52) U.S. Cl.
CPC ........... *G05B 19/414* (2013.01); *H01Q 1/005* (2013.01); *H01Q 3/04* (2013.01); *H01Q 3/24* (2013.01); *G01S 13/0209* (2013.01); *G01S 13/89* (2013.01); *G05B 2219/33218* (2013.01)

(58) Field of Classification Search
CPC . H01Q 1/005; H01Q 3/24; H01Q 3/04; G05B 19/414; G05B 2219/33218; G05B 19/4144
USPC .......................................................... 342/22
See application file for complete search history.

(56) References Cited

U.S. PATENT DOCUMENTS

| | | | |
|---|---|---|---|
| 6,034,643 A | * | 3/2000 | Nishikawa ............... H01Q 3/08 343/765 |
| 2010/0208172 A1 | | 8/2010 | Singh et al. |
| 2017/0176586 A1 | * | 6/2017 | Johnson .................. G01S 13/86 |

FOREIGN PATENT DOCUMENTS

| | | |
|---|---|---|
| CN | 102540185 A | 7/2012 |
| CN | 102540928 A | 7/2012 |
| CN | 102565793 A | 7/2012 |
| CN | 103728972 A | 4/2014 |
| CN | 103810929 A | 5/2014 |
| CN | 104711754 A | 6/2015 |
| CN | 105182346 A | 12/2015 |
| CN | 105467386 A | 4/2016 |
| CN | 105843176 A | 8/2016 |
| CN | 205787855 U | 12/2016 |

OTHER PUBLICATIONS

Translation of Written Opinion for PCT/CN2016/094865, dated Jan. 25, 2017 (Year: 2017).*

* cited by examiner

SERVO ROTARY SCANNING SYSTEM OF THREE-DIMENSIONAL HOLOGRAPHIC IMAGING

CROSS-REFERENCE TO RELATED APPLICATIONS

This is a continuation of International Application PCT/CN2016/094865, with an international filing date of Aug. 12, 2016, which claims foreign priority of Chinese Patent Application No. 201610349789.0, filed on May 24, 2016 in the State Intellectual Property Office of China, the contents of all of which are hereby incorporated by reference.

TECHNICAL FIELD

The present disclosure generally relates to the technical field of mechanical transmission and servo control, and more particularly, relates to a servo rotary scanning system of three-dimensional (3D) holographic imaging.

BACKGROUND

Three-dimensional holographic imaging systems have found wide application in the field of security inspection, and have achieved the purpose of covering and inspecting carried foreign matters with no dead angle due to the capability of observing and imaging from multiple viewing angles as compared to the flat-plate imaging system. In order to achieve precise three-dimensional imaging, an object-under-test needs to be covered from multiple angles by adopting cylindrical scanning. Thus, higher requirements have been imposed on the servo rotary scanning system of three-dimensional holographic imaging. During the operation, a rotary frame for transceiving antenna modules needs to rotate within a certain range of angles and it needs to be ensured that the overall deformation or shaking of the rotary frame in the horizontal direction and the radial direction is below a certain threshold. Due to requirements for the imaging speed imposed by the market, the scanning speed of the three-dimensional holographic imaging system during the operation is relatively high, which results in a decreased stability at the start and stop of the scanning. Moreover, to cooperate with the accurate transmitting and receiving of the signal of the transceiving antenna module, it is also needed to ensure that the rotation of the motor and the transceiving of the transceiving antenna module are performed simultaneously at time sequence, and this imposes requirements for the real-time monitoring and the inspection of the servo control system. During the multiple reciprocating scanning processes of the servo control system, the start and end positions of each scanning have to be positioned accurately, a real-time output rotating angle of the motor and an actual rotating angle of the rotary frame should be fed back in time and the time delay of the feedback should satisfy certain requirements. Accordingly, an urgent need exists in the market to develop a servo rotary scanning system of three-dimensional holographic imaging that satisfies the aforesaid technical requirements.

SUMMARY

An objective of the present disclosure is to provide a servo rotary scanning system of three-dimensional holographic imaging, which is intended to solve the technical problem in the three-dimensional holographic imaging system currently available that a higher running speed of the transceiving antenna module causes a decreased stability at the start and stop of the scanning; and meanwhile, the system satisfies requirements for the real-time monitoring and inspection of the servo rotary scanning system, and the precise positioning of the start and end positions of each scanning during the multiple reciprocating scanning processes.

The present disclosure is achieved in the following way: a servo rotary scanning system of three-dimensional holographic imaging comprises:

a rotary frame, being configured to mount transceiving antenna modules;

a servomotor, being configured to drive the rotary frame to rotate, the servomotor having a first angle sensor for detecting an output rotating angle thereof;

a second angle sensor, being disposed on a rotating axis of the rotary frame and being configured to detect an actual rotating angle of the rotary frame;

a control component, being electrically connected with the second angle sensor; and a servo driver, being configured to control the servomotor to rotate according to the actual rotating angle of the rotary frame and the output rotating angle of the servomotor, the first angle sensor and the control component all being electrically connected with the servo driver.

Further, the rotary frame comprises a first cross arm that is driven by the servomotor to rotate and two carrying arms respectively disposed at two ends of the first cross arm and configured to mount the transceiving antenna modules.

Further, both of the two carrying arms extend along a substantially vertical direction, and a transceiving antenna module is disposed at an inner side of each of the carrying arms.

Further, a rotating axis of the first cross arm is located at a center of the first cross arm.

Further, the servomotor drives the rotary frame to perform reciprocating scanning motion about a rotating axis.

Further, the rotary frame further comprises a second cross arm connected between the two carrying arms, and the first cross arm and the second cross arm are disposed opposite to each other.

Further, the first cross arm, the two carrying arms and the second cross arm are arranged in a rectangular form.

Further, an inner surface of the first cross arm is substantially parallel to an inner surface of the second cross arm.

Further, a line connecting centers of the first cross arm and the second cross arm is the rotating axis of the rotary frame.

Further, the first cross arm, the two carrying arms and the second cross arm are formed into an integral structure or an assembled structure.

Further, the servo rotary scanning system of three-dimensional holographic imaging further comprises a fixing support having an upper mounting arm and a lower mounting arm disposed opposite to each other, and the rotary frame is rotatably mounted between the upper mounting arm and the lower mounting arm.

Further, the servomotor is disposed on the upper mounting arm, the first cross arm is rotatably mounted on the upper mounting arm, the second cross arm is rotatably mounted on the lower mounting arm; or the servomotor is disposed on the lower mounting arm, the first cross arm is rotatably mounted on the lower mounting arm, and the second cross arm is rotatably mounted on the upper mounting arm.

Further, the servomotor and the rotating frame are connected via a reducer.

Further, the control component comprises an upper computer, a first controller configured to receive a scan instruction issued by the upper computer, and a second controller communicatively connected with the first controller and electrically connected with the servo driver.

Further, the servo rotary scanning system of three-dimensional holographic imaging further comprises a rotation direction sensor configured to detect positive and negative rotating orientations of the rotary frame and limit the rotating angle of the rotary frame, and the rotation direction sensor is electrically connected with the second controller.

As compared to the prior art, the present disclosure has the following technical effects: the servo rotary scanning system of three-dimensional holographic imaging may consist of a servomotor having a first angle sensor, a second angle sensor, a control component, a servo driver and a rotary frame. The servo rotary scanning system of three-dimensional holographic imaging is a full-closed loop servo control system, the second angle sensor detects the actual rotating angle of the rotary frame and feeds back a frame feedback signal to the control component, an instruction signal in the control component is compared with the frame feedback signal to generate a following error, the first angle sensor detects an output rotating angle of the servomotor and feeds back a motor feedback signal to the servo driver, and the servo driver controls the servomotor to rotate according to the following error and the motor feedback signal.

The servo rotary scanning system of three-dimensional holographic imaging has a simple structure, a lower cost and a high rotation precision and is easy to be assembled and controlled. The rotary frame can ensure stable start and stop of the scanning even at a higher running speed. To cooperate with the accurate transmitting and receiving of the signal of the transceiving antenna module, the rotation of the servomotor and the transceiving of the transceiving antenna module can be ensured to be performed simultaneously at time sequence, and the requirements for the real-time monitoring and the inspection of the servo control system are satisfied. During the multiple reciprocating scanning processes of the servo control system, the start and end positions of each scanning can be positioned accurately, the real-time output rotating angle of the servomotor and the actual rotating angle of the rotary frame can be fed back in time and the time delay of the feedback satisfies certain requirements.

DETAILED DESCRIPTION

To make objectives, technical solutions and advantages of the present disclosure clearer and easier to be understood, the present disclosure will be further described in detail hereinafter with reference to attached drawings and embodiments. It shall be appreciated that, specific embodiments described herein are only used for explaining the present disclosure and not intended to limit the present disclosure.

Figure 1:
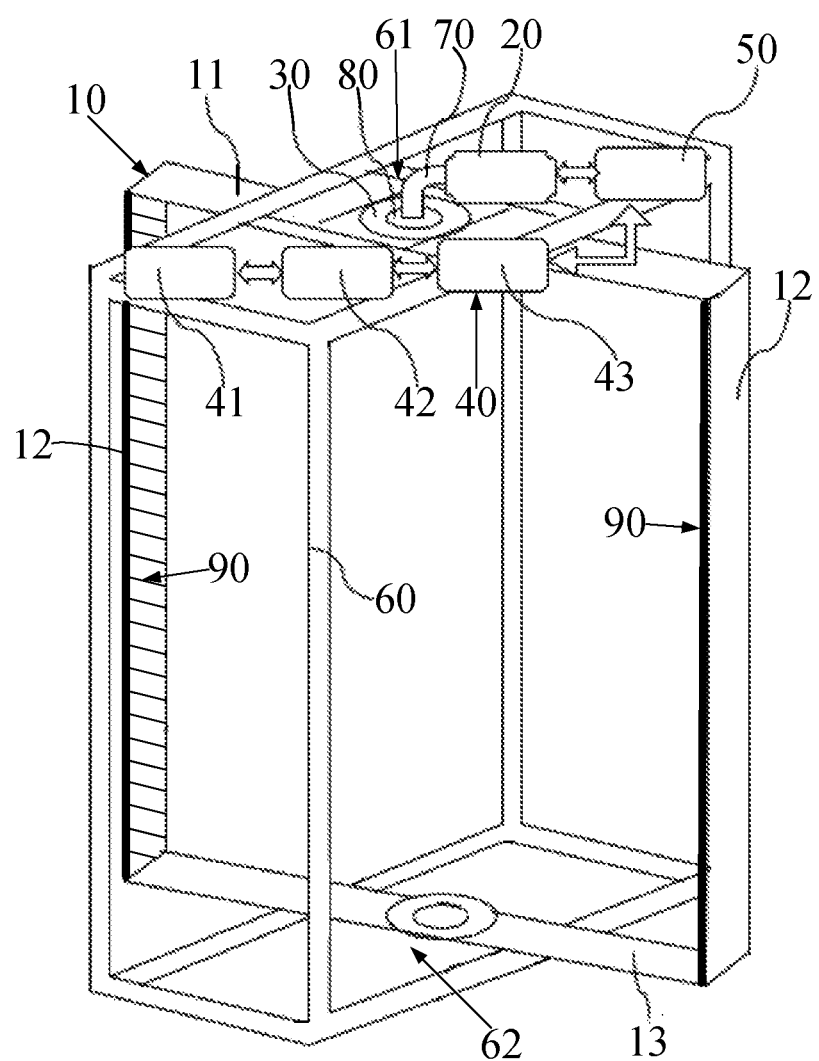
FIG. 1 is a perspective structural view of a servo rotary scanning system of three-dimensional holographic imaging provided according to a first embodiment of the present disclosure.
Figure 2:
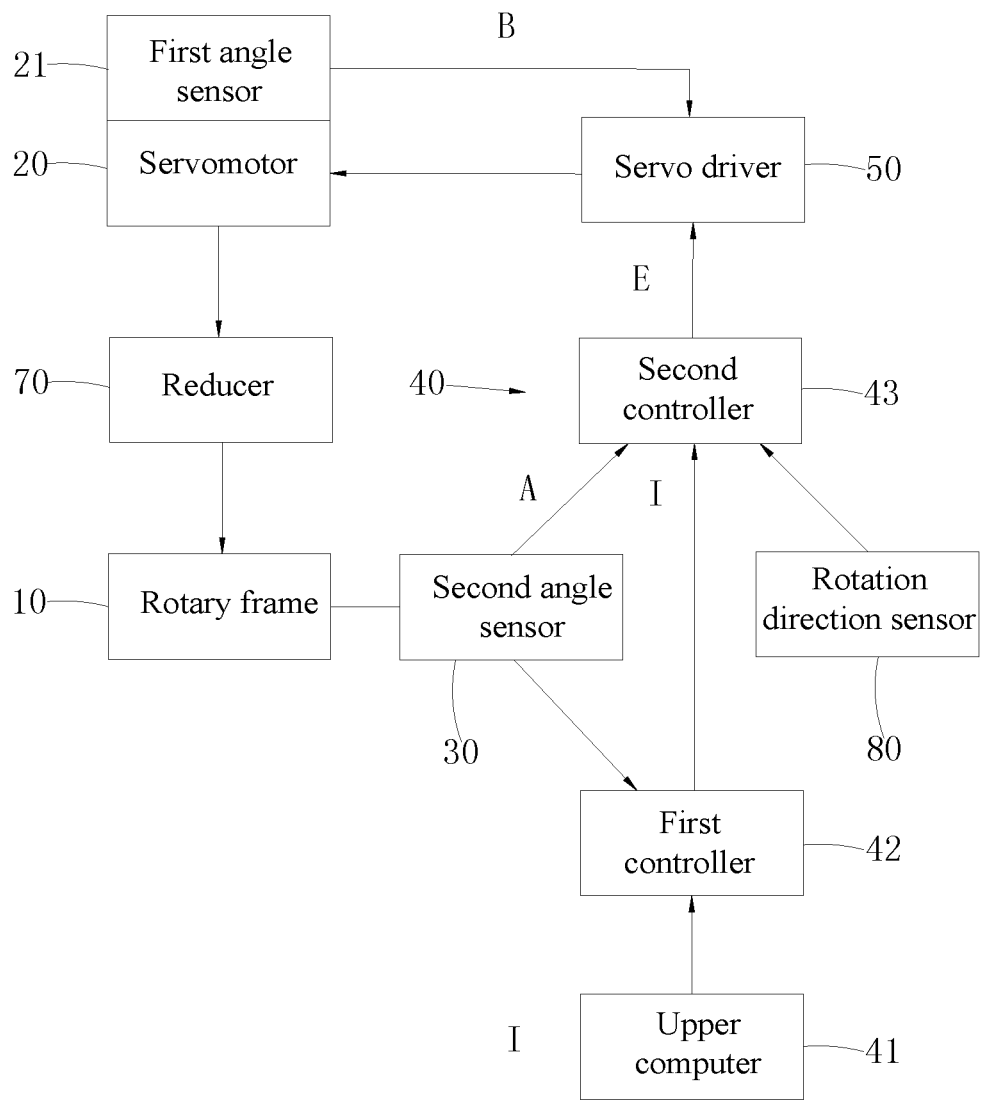
FIG. 2 is a schematic structural view of the servo rotary scanning system of three-dimensional holographic imaging.

Referring to FIG. 1 and FIG. 2, a servo rotary scanning system of three-dimensional holographic imaging provided according to a first embodiment of the present disclosure comprises: a rotary frame 10 that is configured to mount transceiving antenna modules 90; a servomotor 20 that is configured to drive the rotary frame 10 to rotate, the servomotor 20 having a first angle sensor 21 for detecting an output rotating angle thereof; a second angle sensor 30 that is disposed on a rotating axis of the rotary frame 10 and configured to detect an actual rotating angle of the rotary frame 10; a control component 40 that is electrically connected with the second angle sensor 30; and a servo driver 50 that is configured to control the servomotor 20 to rotate according to the actual rotating angle of the rotary frame 10 and the output rotating angle of the servomotor 20, the first angle sensor 21 and the control component 40 all being electrically connected with the servo driver 50.

The servo rotary scanning system of three-dimensional holographic imaging may consist of the servomotor 20 having the first angle sensor 21, the second angle sensor 30, the control component 40, the servo driver 50 and the rotary frame 10, the servo rotary scanning system of three-dimensional holographic imaging may be a full-closed loop servo control system, the second angle sensor 30 may detect the actual rotating angle of the rotary frame 10 and feed back a frame feedback signal A to the control component 40, an instruction signal I in the control component 40 may be compared with the frame feedback signal A to generate a following error E, the first angle sensor 21 may detect an output rotating angle of the servomotor 20 and feed back a motor feedback signal B to the servo driver 50, and the servo driver 50 may control the servomotor 20 to rotate according to the following error E and the motor feedback signal B.

The servo rotary scanning system of three-dimensional holographic imaging may have a simple structure, a lower cost, a high rotation precision and may be easy to be assembled and controlled. The rotary frame 10 can ensure stable start and stop of the scanning even at a higher running speed. To cooperate with the accurate transmitting and receiving of the signal of the transceiving antenna module 90, the rotation of the servomotor 20 and the transceiving of the transceiving antenna module 90 can be ensured to be performed simultaneously at time sequence, and the requirements for the real-time monitoring and the inspection of the servo control system can be satisfied. During the multiple reciprocating scanning processes of the servo control system, the start and end positions of each scanning can be positioned accurately, the real-time output rotating angle of the servomotor 20 and the actual rotating angle of the rotary frame 10 can be fed back in time and the time delay of the feedback satisfies certain requirements.

The transceiving antenna module 90 may comprise several transceiving antenna units arranged in columns. Each of the transceiving antenna units may comprise a transmitting antenna and a receiving antenna disposed adjacent to the transmitting antenna, the radiation transmitted sequentially by the transmitting antennas in all the transceiving antenna units may be irradiated to a to-be-imaged object, and millimeter-waves reflected back from the to-be-imaged object are received sequentially by the receiving antennas corresponding to the transmitting antennas, and thus a predetermined scan area can be scanned. Specifically, the transceiving antenna module 90 may be a millimeter-wave transceiving antenna module, and the millimeter-waves refer to electromagnetic waves having a frequency of 26 GHz to 300 GHz.

The first angle sensor 21 may be built in the servomotor 20 and is configured to detect the output rotating angle of the servomotor 20. The second angle sensor 30 may be mounted at any part of the rotating axis of the rotary frame 10, e.g., at the top or the bottom of the rotary frame 10, to detect the actual rotating angle of the rotary frame 10. Each of the first angle sensor 21 and the second angle sensor 30 may be a rotary transformer, an inductosyn, an optical grating, a magnetic grating, an encoder or other angle detecting elements, and it may be selected depending on actual needs.

In the aforesaid full-close loop servo control system, the control component 40 may be provided with the instruction signal I therein, and the instruction signal I of the control component 40 may be compared with the frame feedback signal A to generate a following error E. If the following error E exceeds a certain range, an alert signal may be generated, and the servo driver 50 controls the servomotor 20 to rotate according to the following error E and the motor feedback signal B. The frame feedback signal A fed by the second angle sensor 30 back to the control component 40 may be a position feedback signal, and the motor feedback signal B fed by the first angle sensor 21 back to the servo driver 50 may be a position and speed feedback signal. Relevant software algorithms involved in controlling the servomotor 20 to rotate by the servo driver 50 according to the following error E and the motor feedback signal B belong to the prior art.

Further, the rotary frame 10 may comprise a first cross arm 11 that can be driven by the servomotor 20 to rotate and two carrying arms 12 respectively disposed at two ends of the first cross arm 11 and configured to mount the transceiving antenna module 90. The servomotor 20 may drive the first cross arm 11 to rotate, the two carrying arms 12 may be distributed opposite to each other, and an inner side of each of the carrying arms 12 may be provided with a transceiving antenna module 90, two transceiving antenna modules 90 may form a predetermined scan area therebetween, and the two transceiving antenna modules 90 may rotate about a same plumb line to scan the predetermined scan area. The servomotor 20 may drive the rotary frame 10 to perform half-circular reciprocating scanning motion, thereby achieving cylindrical rotary scanning. When a person stands within the predetermined scan area, three-dimensional scanning of the human body can be accomplished simply by scanning for one time. Both of the two carrying arms 12 extend along the vertical direction, and the transceiving antenna modules 19 on the two carrying arms 12 can scan the predetermined scan area by rotating about the same plumb line.

Further, a rotating axis of the first cross arm 11 may be located at a center of the first cross arm 11. This structure may enable the rotary frame 10 to rotate stably and symmetrically about the rotating axis, and during the operation, the rotary frame 10 can rotate within a certain range of angles and it can be ensured that the overall deformation or shaking of the rotary frame 10 in the horizontal direction and the radial direction is below a certain threshold.

Further, the servomotor 20 may drive the rotary frame 10 to perform reciprocating scanning motion about the rotating axis. A single time of scanning may cover any angle interval within −90° to 90°. Further, the rotating angle can be 120°, and the same angle can be scanned in the opposite direction during the next time of scanning. The range of angular speed θ for rotary scanning can be 10°/s<θ<80°/s; and the time range for a single time of scanning can be 2 seconds to 10 seconds. This may be selected depending on specific needs.

Alternatively, the number of the carrying arm 12 can be one, and an inner side of the carrying arm 12 may be provided with a transceiving antenna module 90, the transceiving antenna module 90 may form a predetermined scan area toward one side of the rotating axis, and the transceiving antenna module 90 may rotate about a plumb line to scan the predetermined scan area. This solution may achieve partial rotary scanning or cylindrical rotary scanning. For example, the range of the rotating angle of the transceiving antenna module 90 can be 120°, and when the person stands within the predetermined scanning area, the front and the back sides of the person respectively face the transceiving antenna module 90, and the three-dimensional scanning of the human body can be accomplished simply by scanning for two times. Alternatively, the range of the rotating angle of the transceiving antenna module 90 can be 300°, and when the person stands within the predetermined scanning area, the three-dimensional scanning of the human body can be accomplished simply by scanning for one time.

Further, the rotary frame 10 may further comprise a second cross arm 13 connected between the two carrying arms 12, and the first cross arm 11 and the second cross arm 13 may be disposed opposite to each other. The servomotor 20 may drive the first cross arm 11 to rotate, and it may simultaneously drive the transceiving antenna modules 90 on the two carrying arms 12 to rotate about the same plumb line to scan the predetermined scan area, and the second cross arm 13 may enable the rotary frame 10 to have an overall stable structure and small shaking during the rotation.

Further, the first cross arm 11, the two carrying arms 12 and the second cross arm 13 may be arranged in a rectangular form. This structure is stable, and during the rotation, the rotary frame 10 can rotate within a certain range of angles and it can be ensured that the overall deformation or shaking of the rotary frame 10 in the horizontal direction and the radial direction may be below a certain threshold.

Further, the two carrying arms 12 may be symmetrically and vertically mounted at two ends of the first cross arm 11 and the second cross arm 13, and the perpendicularity error may be ensured to be within a range of 0.01°. An inner surface of the first cross arm 11 may be substantially parallel to an inner surface of the second cross arm 13, and the actual nonparallelism between the inner surfaces (surfaces toward the center of the cylinder) of the two carrying arms 12 may be ensured to be within a range of ±0.5 mm/2000 mm. A distance between the inner surfaces of the two carrying arms 12 can be 1200.00 mm. A line connecting centers of the first cross arm 11 and the second cross arm 13 may be the rotating axis of the rotary frame 10. During the process of the rotary scanning motion, by adopting the rotary structure in the form of a frame, the relative positional relationship between the transceiving antenna module 90 and the carrying arm 12 may be fixed, the relative positional relationship between the transceiving antenna module 90 and the servomotor 20 of the rotary structure may be fixed, and the relative positional relationship between the carrying arm 12 and the servomotor 20 of the rotary structure may be fixed. The amplitude of the radial and tangential vibration is small. The range of deviation of the relative positional relationship between the transceiving antenna module 90 and the carrying arm 12 should be limited so that the amplitude of the radial vibration may be less than ±0.5 mm, and the amplitude of the tangential vibration may be less than ±0.5 mm. The range of deviation of the relative positional relationship between the transceiving antenna module 90 and the servomotor 20 of the rotary structure should be limited so that the amplitude of the radial vibration may be less than ±0.5 mm, and the amplitude of the tangential vibration may be less than ±0.5 mm. The range of deviation of the relative positional relationship between the carrying arm 12 and the servomotor 20 of the rotary structure should be limited so that the amplitude of the radial vibration may be less than ±0.5 mm, and the amplitude of the tangential vibration may be less than ±0.5 mm. The structure may be detachable and may have a high precision for repeating the assembling, and the precision for repeating the assembling after the parts are detached may be ensured to be within the range of ±0.5 mm/2000 mm.

Further, the first cross arm 11, the two carrying arms 12 and the second cross arm 13 may be formed into an integral structure or an assembled structure. For example, the first cross arm 11, the two carrying arms 12 and the second cross arm 13 may be cast integrally, and this solution may be easy for manufacturing and the structure obtained thereby is stable.

Further, the system further comprises a fixing support 60 having an upper mounting arm 61 and a lower mounting arm 62 disposed opposite to each other, and the rotary frame 10 may be rotatably mounted between the upper mounting arm 61 and the lower mounting arm 62. The fixing support 60 may facilitate the mounting of the rotary frame 10, and the rotary frame 10 may rotate on the fixing support 60 stably. The fixing support 60 may adopt the form of four supporting columns, and the upper mounting arm 61 and the lower mounting arm 62 may adopt an I beam, so it may be easy to be manufactured and the structure obtained thereby is stable. As shall be appreciated, it may be also feasible to drive the rotary frame 10 to rotate by the servomotor 20 without providing the fixing support 60.

Further, the servomotor 20 may be mounted on the upper mounting arm 61, the first cross arm 11 may be rotatably mounted on the upper mounting arm 61, and the second cross arm 13 may be rotatably mounted on the lower mounting arm 62. The overall structure is stable, the shaking during the rotation of the rotary frame 10 may be small, and the second cross arm 13 may be arranged at a lower position. The second cross arm 13 may be provided with a rotating shaft thereon, the lower mounting arm 62 may have a mounting hole thereon, an end of the rotating shaft may be inserted into the mounting hole, and the rotating shaft may rotate about an axis of the mounting hole to achieve the purpose of rotatably mounting the second cross arm 13 on the lower mounting arm 62.

Further, the servomotor 20 and the rotating frame 10 may be connected via a reducer 70. The reducer 70 may improve the output torque by decreasing the output rotation speed so as to drive the rotary frame 10 to rotate. For this solution, the structure is simple, the mounting is convenient and the positioning precision can be ensured.

Further, the control component 40 may comprise an upper computer 41, a first controller 42 that may be configured to receive a scan instruction issued by the upper computer 41, and a second controller 43 that may be communicatively connected with the first controller 42 and electrically connected with the servo driver 50. A user may input an instruction via the upper computer 41, and the upper computer 41 may send a control instruction to the second control 43 via the first controller 42 and receive returned status information. The first control 42 may communicate with the second controller 43, and the first controller 42 may send a control command to the second controller 43 and receive returned status information. The second controller 43 may send enable control and scan direction instructions and a scan speed instruction to the servo driver 50 according to the received control command, and may control the servomotor 20 to rotate indirectly via the servo driver 50. The rotation speed of the servomotor 20 may be preset in the servo driver 50, and the servo driver 50 may drive the servomotor 20 to run at different speed modes according to different speed instructions. The servo driver 50 may preset various running modes to satisfy requirements of precise rotation and positioning. Meanwhile, the servomotor 20 may have the first angle sensor 21 built therein, the first angle sensor 21 may generate and feed back a pulse sequence to the second controller 43 to analyze the running status of the servomotor 20 during the operation of the servomotor 20, and may return the status information to a program of the upper computer 41. The second angle sensor 30 may generate a pulse signal and feed the pulse signal back to the second controller 43 in real time, and the servo driver 50 may drive the servomotor 20 to rotate. The second angle sensor 30 may input the pulse signal to the first controller 42, and the first controller 42 may process the received pulse signal to determine whether to trigger the operation of the transceiving antenna module 90 and other modules.

Specifically, the first controller 42 may be a PLC programmable logic device. The second controller 43 may be an FPGA control panel. The PLC programmable logic device may cooperate with the FPGA control panel so that the overall system is more stable, the later maintenance may be convenient and the probability of failure of the overall system can be reduced. The FPGA control panel communicates with the PLC programmable logic device, the communication interface may adopt RS422/RS232 or network ports to achieve communication, and a communication protocol with the PLC programmable logic device may comprise a frame header, an instruction word, a status word, a frame count and parity bit information. The communication protocol between the PLC programmable logic device and the servo driver 50 may satisfy design requirements of the driver. The FPGA control panel may generate various kinds of triggering signals and time sequence signals to trigger the operation of the transceiving antenna module 90 and other apparatuses. The number of triggering interfaces of the FPGA control panel may be greater than 2, and the apparatuses triggered by the FPGA control panel may include but not limited to the transceiving antenna module 90. Moreover, the signals may be output via multiple channels, and the time sequence signals may be output through the combination of multiple channels to trigger or control other apparatuses, e.g., output by the combination of four channels to generate independent time signals of 16 bits. It shall be appreciated that, other types of controllers may also be selected as the first controller 42 and the second controller 43.

Further, the second angle sensor 30 may be an encoder, and the encoder may detect an actual rotating angle signal of the rotary frame 10 in real time and input the signal to the first controller 42. During the process of scanning motion, the servo rotary scanning system may calculate the number of square signals to determine the rotated angle, and the resolution of the angle position may be superior to 0.005°. One position triggering signal may be sent every $\Delta\theta$ ($\Delta\theta$ is an angle interval, $\Delta\theta$ is an angle determined between 0.20° and 0.40°), and during the rotary scanning motion having an effective travel of $\theta$, a total of N (N=$\theta/\Delta\theta$, taking the integer part of N) angle position triggering signals may be outputted. The angle interval of the scanning motion may be set by the communication interface with a program in the second controller 43. During the process of reciprocating scanning, the repeated positioning precision of the upper mounting arm 61 and the lower mounting arm 62 may be ±0.01° (repeated for 100 times); the absolute positioning precision of the upper mounting arm 61 and the lower mounting arm 62 may be ±0.01°; and the angle position error corresponding to the position triggering pulse should be superior to ±0.01°.

Further, the system further may comprise a rotation direction sensor 80 that is configured to detect positive and negative rotating orientations of the rotary frame 10 and limit the rotating angle of the rotary frame 10, and the rotation direction sensor 80 may be electrically connected with the second controller 43. The rotation direction sensor 80 may monitor the current positive and negative orientation of the rotary frame 10 in real time and obtain an absolute zero position, and the rotation direction sensor 80 may further monitor whether the frame selected for use exceeds a limiting position and feeds status information back to the second controller 43. Specifically, the rotation direction sensor 80 may be an optoelectronic switch, a combination of two rotary encoders or other rotation direction sensors. The rotation direction sensor 80 mounted on the rotating axis and fixed on the fixing support 60 may adopt the optoelectronic switch, and takes 0° as a center zero position, wherein the negative angle is the negative direction, and the positive angle is the positive direction. The optoelectronic switch may distinguish the position and negative directions by outputting a high or low level, and the jumping point between the high level and the low level may be the center zero position. Alternatively, the rotation direction sensor 80 may adopt two rotary encoders, and the two rotary encoders may output two sets of pulses of which the phase difference is 90 degrees, and the rotation speed can be measured and the direction of the rotation can be determined according to the two sets of pulses. Furthermore, it may be set inside the rotation direction sensor 80 that the positive level and the negative level are only output within a certain range of angles, e.g., which may be limited to ±60°, and when the limited angle is exceeded, different signals may be output to indicate that the scanning angle exceeds the specified upper limit of the range and the signals may be sent to the second controller 43 so that security measures can be adopted. The measures that can be selected include but not limited to turning off the power, enabling the motor to suspend, and idling of the motor without load or the like. The rotation direction sensor 80 may transmit the orientation signal, the limiting signal or the like to the second controller 43 in real time so as to control the servomotor 20 to rotate in a correct and safe manner.

Further, the system further may comprise a power source for providing electrical energy for devices such as the servo motor 20, the control component 40 and the servo driver 50 or the like.

Figure 3:
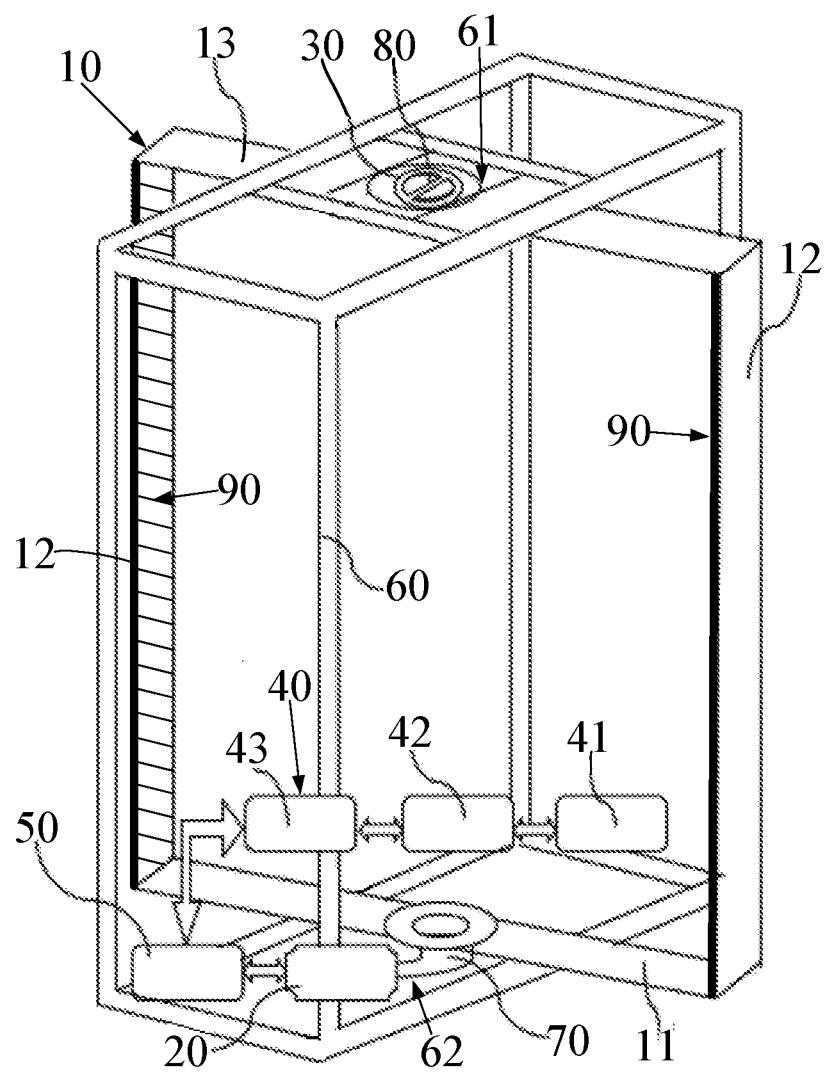
FIG. 3 is a perspective structural view of a servo rotary scanning system of three-dimensional holographic imaging provided according to a second embodiment of the present disclosure.

Referring to FIG. 2 and FIG. 3, a servo rotary scanning system of three-dimensional holographic imaging provided according to a second embodiment of the present disclosure is generally the same as the servo rotary scanning system of three-dimensional holographic imaging provided according to the first embodiment, and the second embodiment differs from the first embodiment in that, the servomotor 20 may be disposed on the lower mounting arm 62, the first cross arm 11 may be rotatably mounted on the lower mounting arm 62, and the second cross arm 13 may be rotatably mounted on the upper mounting arm 61. The overall structure is stable, the shaking of the rotary frame 10 may be small during the rotation, the servomotor 20 may be convenient to be mounted, and the overall system is safe in use. The second cross arm 13 may be provided with a rotating shaft thereon, the upper mounting arm 61 may have a mounting hole thereon, an end of the rotating shaft may be inserted into the mounting hole, and the rotating shaft may rotate about an axis of the mounting hole to achieve the purpose of rotatably mounting the second cross arm 13 on the upper mounting arm 61.

The servo rotary scanning system of three-dimensional holographic imaging may include the servomotor 20 having the first angle sensor 21, the second angle sensor 30, the control component 40, the servo driver 50 and the rotary frame 10, the servo rotary scanning system of three-dimensional holographic imaging may be a full-closed loop servo control system, the second angle sensor 30 may detect the actual rotating angle of the rotary frame 10 and feed back a frame feedback signal A to the control component 40, an instruction signal I in the control component 40 may be compared with the frame feedback signal A to generate a following error E, the first angle sensor 21 may detect an output rotating angle of the servomotor 20 and feed back a motor feedback signal B to the servo driver 50, and the servo driver 50 may control the servomotor 20 to rotate according to the following error E and the motor feedback signal B. The servo rotary scanning system of three-dimensional holographic imaging may have a simple structure, a lower cost and a high rotation precision and may be easy to be assembled and controlled. The rotary frame 10 can ensure stable start and stop of the scanning even at a higher running speed. To cooperate with the accurate transmitting and receiving of the signal of the transceiving antenna module 90, the rotation of the servomotor 20 and the transceiving of the transceiving antenna module 90 can be ensured to be performed simultaneously at time sequence, and the requirements for the real-time monitoring and the inspection of the servo control system can be satisfied. During the multiple reciprocating scanning processes of the servo control system, the start and end positions of each scanning can be positioned accurately, the real-time output rotating angle of the servomotor 20 and the actual rotating angle of the rotary frame 10 can be fed back in time and the time delay of the feedback satisfies certain requirements.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:
1. A servo rotary scanning system of three-dimensional (3D) holographic imaging comprising:
    a rotary frame, being configured to mount transceiving antenna modules;
    a servomotor, being configured to drive the rotary frame to rotate along a rotating axis, the servomotor having a first angle sensor for detecting an output rotating angle thereof;
    a second angle sensor, being disposed on a position of the rotary frame where the rotating axis of the rotary frame is passed through, and being configured to detect an actual rotating angle of the rotary frame;
    a control component, being electrically connected with the second angle sensor; and
    a servo driver, being configured to control the servomotor to rotate according to the actual rotating angle of the rotary frame and the output rotating angle of the servomotor, the first angle sensor and the control component all being electrically connected with the servo driver.

2. The servo rotary scanning system of three-dimensional holographic imaging of claim 1, wherein the rotary frame comprises a first cross arm that is driven by the servomotor to rotate, and two carrying arms respectively disposed at two ends of the first cross arm and perpendicular to the first cross arm, so that the two carrying arms are parallel to each other; the carrying arm comprises an inside face and an outside face opposite to each other, and the inside faces of the two carrying arms are disposed facing to each other; the number of the transceiving antenna modules are two; and the two transceiving antenna modules are disposed on the inside faces of the two carrying arms respectively, so that the two transceiving antenna modules are disposed facing to each other.

3. The servo rotary scanning system of three-dimensional holographic imaging of claim 2, wherein both of the two carrying arms extend along a vertical direction, and a transceiving antenna module is disposed at an inner side of each of the carrying arms.

4. The servo rotary scanning system of three-dimensional holographic imaging of claim 2, wherein a rotating axis of the first cross arm is located at a center of the first cross arm.

5. The servo rotary scanning system of three-dimensional holographic imaging of claim 2, wherein the servomotor drives the rotary frame to perform reciprocating scanning motion about a rotating axis.

6. The servo rotary scanning system of three-dimensional holographic imaging of claim 2, wherein the rotary frame further comprises a second cross arm connected between the two carrying arms, and the first cross arm and the second cross arm are disposed opposite to each other.

7. The servo rotary scanning system of three-dimensional holographic imaging of claim 6, wherein the first cross arm, the two carrying arms and the second cross arm are arranged in a rectangular form.

8. The servo rotary scanning system of three-dimensional holographic imaging of claim 6, wherein a line connecting centers of the first cross arm and the second cross arm is the rotating axis of the rotary frame.

9. The servo rotary scanning system of three-dimensional holographic imaging of claim 6, wherein the first cross arm, the two carrying arms and the second cross arm are formed into an integral structure or an assembled structure.

10. The servo rotary scanning system of three-dimensional holographic imaging of claim 6 further comprising a fixing support having an upper mounting arm and a lower mounting arm disposed opposite to each other, and the rotary frame is rotatably mounted between the upper mounting arm and the lower mounting arm.

11. The servo rotary scanning system of three-dimensional holographic imaging of claim 10, wherein the servomotor is disposed on the upper mounting arm, the first cross arm is rotatably mounted on the upper mounting arm, the second cross arm is rotatably mounted on the lower mounting arm; or the servomotor is disposed on the lower mounting arm, the first cross arm is rotatably mounted on the lower mounting arm, and the second cross arm is rotatably mounted on the upper mounting arm.

12. The servo rotary scanning system of three-dimensional holographic imaging of claim 1, wherein the servomotor and the rotating frame are connected via a reducer.

13. The servo rotary scanning system of three-dimensional holographic imaging of claim 1, wherein the control component comprises an upper computer, a first controller configured to receive a scan instruction issued by the upper computer, and a second controller communicatively connected with the first controller and electrically connected with the servo driver.

14. The servo rotary scanning system of three-dimensional holographic imaging of claim 13 further comprising a rotation direction sensor configured to detect positive and negative rotating orientations of the rotary frame and limit the rotating angle of the rotary frame, and the rotation direction sensor is electrically connected with the second controller.

15. A servo scanning system of three-dimensional holographic imaging, comprising:
a fixing support comprising:
an upper mounting arm;
a lower mounting arm spaced from the upper mounting arm; and
supporting columns connecting the upper and lower mounting arms to define a space;
a frame mounted in the space and capable of rotating about an imaginary axis relative to the fixing support, the frame comprising:
a first cross arm coupled on the upper mounting arm;
a second cross arm coupled on the lower mounting arm and parallel to the first cross arm; and
carrying arms connecting the first and second cross arms, wherein transceiving antenna modules are mounted on the second cross arm;
a servomotor configured to drive the first cross arm to rotate along a rotating axis, the servomotor having a first angle sensor for detecting an output rotating angle thereof;
a second angle sensor, being disposed on a connection where the upper mounting arm and the first cross arm are connected, the second angel sensor being configured to detect an actual rotating angle of the rotary frame, wherein the connection is a position of where the rotating axis is passed through;
a control component, being electrically connected with the second angle sensor; and
a servo driver, being configured to control the servomotor to rotate according to the actual rotating angle of the frame and the output rotating angle of the servomotor, the first angle sensor and the control component all being electrically connected with the servo driver.

16. The servo scanning system of claim 15, wherein the upper mounting arm is substantially parallel to the lower mounting arm, the imaginary axis is substantially perpendicular to the upper mounting arm, the frame is configured to rotate about the connection.

17. The servo scanning system of claim 16, wherein the connection is located on a center of the first cross arm.

18. The servo scanning system of claim 15, wherein the number of the carrying arms are two; the number of the transceiving antenna modules are two; the two carrying arms are perpendicular to the first cross arm, so that the two carrying arms are parallel to each other; the carrying arm comprises an inside face and an outside face opposite to each other, and the inside faces of the two carrying arms are disposed facing to each other; and the two transceiving antenna modules are disposed on the inside faces of the two carrying arms respectively, so that the two transceiving antenna modules are disposed facing to each other.

* * * * *